(12) United States Patent
Ito (10) Patent No.: US 6,701,154 B2
(45) Date of Patent: Mar. 2, 2004

(54) DATA PROVIDING SYSTEM AND METHOD (75) Inventor: Noriko Ito, Tokyo (JP)

(73) Assignee: NEC Corporation, Tokyo (JP)

(*) Notice: Subject to any disclaimer, the term of this patent is extended or adjusted under 35 U.S.C. 154(b) by 436 days.

(21) Appl. No.: 09/814,366

(22) Filed: Mar. 21, 2001

(65) Prior Publication Data
US 2001/0029183 A1 Oct. 11, 2001

(30) Foreign Application Priority Data

Apr. 6, 2000 (JP) ........................................ 2000-105140

(51) Int. Cl.⁷ ................................................ H04Q 7/20
(52) U.S. Cl. .................................. 455/456.1; 455/426.1
(58) Field of Search ............................ 455/456.1, 426.1

(56) References Cited

U.S. PATENT DOCUMENTS 6,029,068 A * 2/2000 Takahashi et al. ......... 455/426.1

FOREIGN PATENT DOCUMENTS

CA    09/814366    3/2001

* cited by examiner

Primary Examiner—William Cumming
(74) Attorney, Agent, or Firm—Scully, Scott, Murphy & Presser (57) ABSTRACT Position data and spot data of explanation contents are stored in a spot data database in a center. Preference data of the individual users are stored in a preference data database. Group's preference data of user groups are stored in group's preference data database in the center. When the center extracts each user's present time and present position from data received from the user, it selects spot data on the basis of the user's resent time and present position and also preference data and user group's preference data obtained with user ID from the preference data database and the user group's preference data database, and instructs transmission of the selected spot data to the pertinent user's portable data terminal. Thus, it is possible to provide apt data to users even when the users take action patterns different from a usual action pattern.

7 Claims, 7 Drawing Sheets

DATA PROVIDING SYSTEM AND METHOD

BACKGROUND OF THE INVENTION

This application claims benefit of Japanese Patent Application No. 2000-105140 filed on Apr. 6, 2000, the contents of which are incorporated by the reference.

The present invention relates to user-directed data providing systems and methods and, more particularly, to mobile-user-directed data providing systems and methods, which serve users having portable data terminals by learning not only user's preferences but also user group's preferences and providing trend data obtained by the learning with the present time, the position and the preference of each user taken into considerations.

The applicant earlier proposed in Japanese Patent Application No. 11-312487 a system, which utilizes data providing service broadcasting and receiving, in a portable terminal, advertisement which is produced by taking user's position data and preference data into considerations. The applicant also proposed in Japanese Patent Application No. 11-290379 a system for automatically obtaining personal preferences from personal action patterns. To get service utilizing this system, the user carries a portable terminal having a GPS position obtaining mechanism. The portable terminal can recognize shops and other spots frequently visited by the user, and extract user's preferences from attribute data of the shops and other spots.

Meanwhile, a cooperative filtering technique is well known in the art as a mechanism for collecting personal data, grouping the collected data and providing common proposals for each group. For example, in order to learning customer's needs and preferences from historical data for more personalized one-to-one marketing a technique, (http://www.netperceptions.com/) which utilizes the cooperative filtering technique, has been provided. The above systems (Japanese Patent Applications No. 11-323487 and 11-290379) provide data, on which user's preferences learned in areas visited by users are reflected. This means that these systems can provide data, in which only preference data obtained from usual action patterns of the individual users are taken into considerations. Therefore, in areas first visited by users, data with user's preference data reflected thereon may not be provided, or it may be meaningless to provide data with user's preference data reflection.

For example, a case will be considered, in which a user who frequently goes to Italian restaurants so that his or her preference data has been learned such that he or she "likes Italian hoods", is going to make a trip to Hakone. In this case, the systems provide data of Italian restaurants in Hakone to the user. However, if the user also has a preference that he or she more likes local dishes in sight-seeing areas, the user desires data of local dishes. However, in the technique described above, local dish spots not visited by the user are not learned, and no data as desired is provided.

SUMMARY OF THE INVENTION

An object of the present invention is to realize a technique, which can solve the above problems by learning not only preferences of individual users carrying portable data terminals but also user group's preferences and thus providing trend data on the basis of the group's preference data by taking the present time, present position and preferences of each user into considerations, thus providing effective data for the users. In addition, since the present invention seeks to provide user group's preference data of subject user groups for data providers, the data providers can manage customer data and utilize these data as marketing data. Furthermore, data providers providing advertisement data can use group's preference data for producing effective advertisements.

A first invention is a mobile-user-directed data providing system comprising a portable data terminal, a center and a data-provider-directed terminal, the terminals and the center being interconnected by a communication line, wherein: the portable data terminal includes: a position managing means for obtaining and managing the position of the portable data terminal; a communication managing means for managing the position data, time data of time when the position data is obtained and user ID specifying a user as transmission data, transmitting the transmission data to the center and receiving data therefrom; and data displaying means for displaying the data received from the center; the center includes: a communication managing means for transmitting and receiving data to and from the portable data terminal and the data-provider-directed terminal; user data material extracting means for extracting the present time and the present place of each user from data received therefrom and preserving the extracted data; a spot data database for storing the position data and spot data of explanation contents concerning restaurants and sight-seeing spots; a preference learning means for learning user's preferences from the data stored in the user data material extracting means and the spot data database; a user's preference data database for storing each user's preference data produced by learning in the preference learning means; a group's preference learning means for learning user group's preference data from the data stored in the user's preference data database; a group's preference data database for storing user group's preference data produced by learning in the group's preference learning means; a user's status matching means for selecting spot data on the basis of the user's present time and present place, preference data and user group's preference data obtained with the user ID from the user's preference data database and the group's preference data database, respectively, and instructing the communication managing means to transmit the selected spot data to the user's portable data terminal; a data-provider-directed data producing means for instructing the communication managing means to transmit the result of retrieval of subject user group's preference data in the group's preference data database for each data provider to the data-provider-directed terminal; and a data inputting means for inputting the spot data from the data-provider-directed terminal to the spot data database; and the data-provider-directed terminal includes a communication managing means for transmitting and receiving data to and from the center; a spot data producing means used by the data provider for producing contents of spot data and instructing the communication managing means to transmit the produced spot data to the center; a spot data database for storing the spot data produced in the spot data producing means; and a group s preference data database for receiving the group s preference data transmitted from the center and received via the communication managing means.

Thus, it is possible to learn not only preferences of individual users carrying portable data terminals but also user group's preference data and provide trend data on the basis of the group's preference data by taking the present time, present position and preferences of each user into considerations. According to the present invention, it is thus possible to provide effective data for users. In addition, according to the present invention user group's preference data of subject user groups are provided for data providers.

The data providers thus can effectively produce data. For example, the data providers can manage customer data and utilize these data as marketing data. Furthermore, data providers providing advertisement data can use group's preference data for producing effective advertisement.

In a modified invention of the first invention, the spot data database deals with advertisement data as spot data. Thus, the center can get the advertisement income. In another modified invention, the communication line is a portable telephone line. Thus, it is possible to use the existing systems.

A second invention is a mobile-user-directed data providing method in a data providing system comprising a user's portable data terminal, a center and a data-provider-directed terminal, the terminals and the center being interconnected by a communication line, comprising: a step of learning user's preferences from a spot data database, in which position data and spot data of explanation contents such as restaurants and sight-seeing spots are stored, and storing the learned user's preference data in a use's preference data database; a step of extracting the user's present time and present place data received from the user and preserving the extracted data; a step of learning user group's preference data from data stored in the user's preference data database and storing the learned data in a group's preference data database; a step of selecting spot data on the basis of the user's present time and present position, and preference data and user group's preference data obtained with user ID from the user's preference data base and the group's preference data base obtained from user's group preference data, and instructing the transmission of the selected spot data to the portable data terminal of the user; a step of retrieving user group's preference data in the group's preference data database as subject for each data provider and transmitting the result of retrieval to the data-provider-directed terminal; a step of inputting the spot data from the data-provider-directed terminal to the spot data database; a step of producing contents of spot data, storing the produced contents in a spot data database and instructing the transmission of the produced spot data to the center; and a step of receiving group's preference data and storing the received data in the group's preference data database.

Thus, according to the present invention it is possible to learn not only preferences of individual users carrying portable data terminals but also user group's preference data and provide trend data on the basis of the group's preference of each user into considerations. It is thus possible to provide effective data for users.

In addition, user group's preference data of subject user groups are provided for data providers. The data providers thus can effectively produce data. For example, it is possible to manage customer data and utilize group's preference data as marketing data. Furthermore, data providers providing advertisement data can use group's preference data for producing effective advertisements.

In a modified invention of the second invention, the spot data database deals with advertisement data as spot data. Thus, the center can get the advertisement income. In another modified invention, the communication line is a portable telephone line. Thus, it is possible to use the existing systems.

Other objects and features will be clarified from the following description with reference to attached drawings.

PREFERRED EMBODIMENTS OF THE INVENTION

Preferred embodiments of the present invention will now be described with reference to the drawings.

Figure 1:
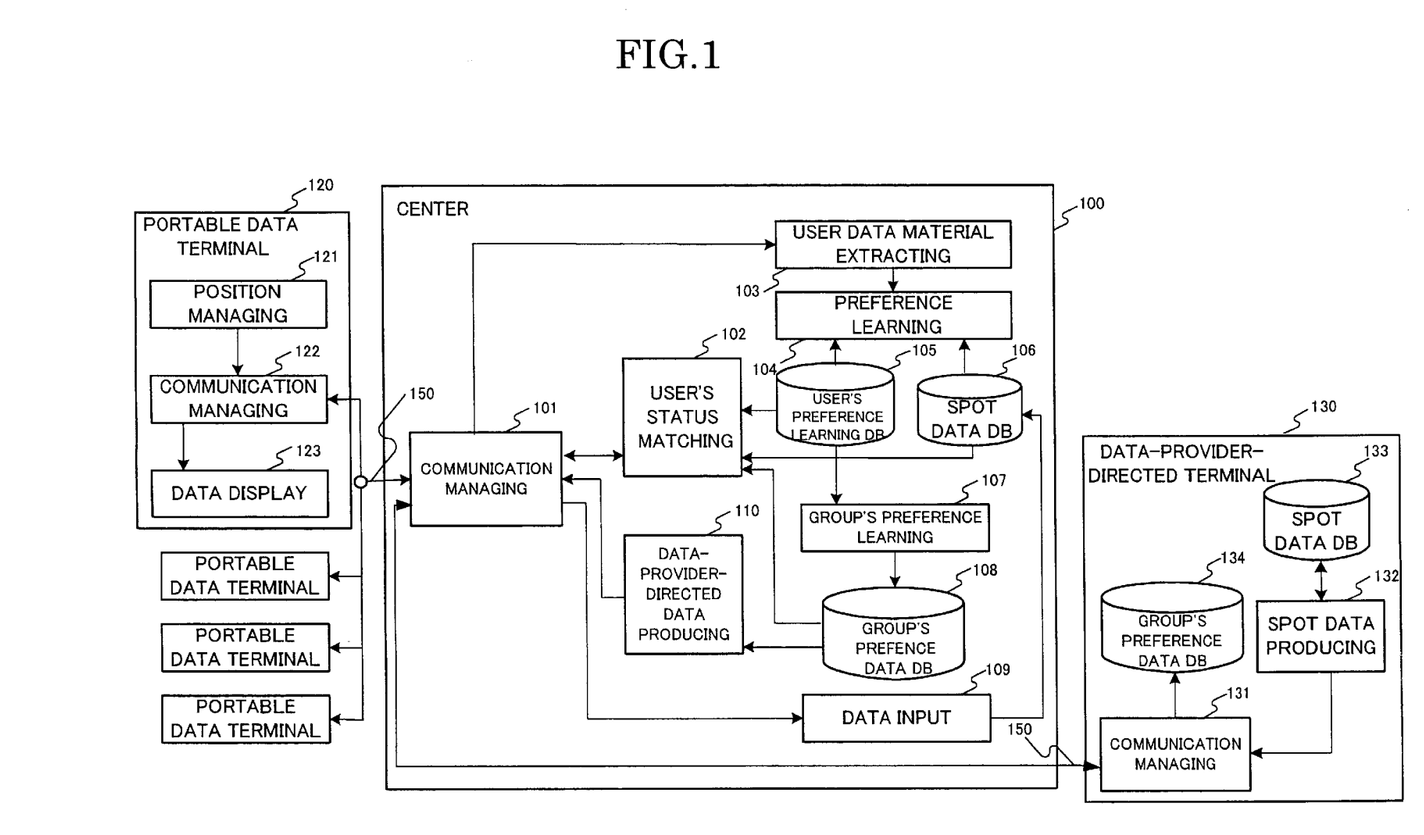
FIG. 1 shows a data providing system according to an embodiment of the present invention.

Referring to FIG. 1, the data providing system according to the present invention comprises a center 100, a portable data terminal 120, a data-provider-directed terminal 130 and a radio communication line 150 interconnecting the center 100 and the terminals 120 and 130.

The portable data terminal 120 is a data processor such as a note PC or a PDA (Personal Digital Assistant) which is carried by the user. The terminal 120 includes a position managing means 121, a communication managing means 122 and a data displaying means 123.

Figure 2:
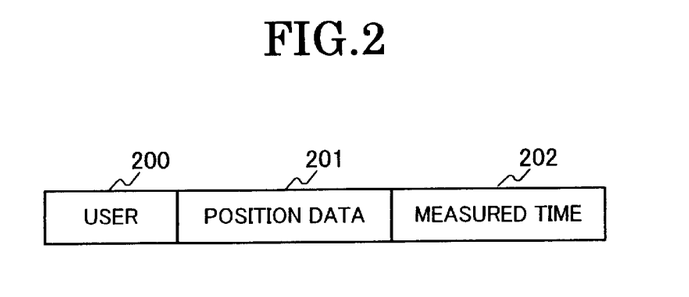
FIG. 2 shows an example of the data configuration of the transmitted data.

The position managing means 121 obtains and manages position data of the portable data terminal 120. The means 121 obtains the position data by using, for instance, a GPS (Global Positioning System). The communication managing means 122 transmits position data transmitted from the position managing means 121, the measured time data and user ID to the center 100. FIG. 2 shows an example of the data configuration of the transmitted data. Where time measurement is executed in the center 100, no measured time data of course need be transmitted.

Figure 3:
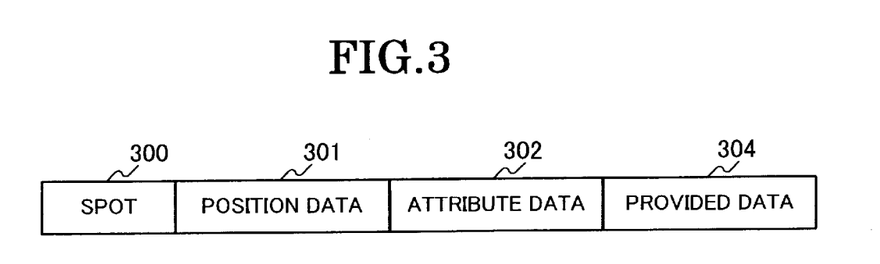
FIG. 3 shows an example of the data configuration of the spot data.

The data displaying means 123 displays the data transmitted from the center 100 to be comprehended by the user. FIG. 3 shows an example of the data configuration of the data transmitted from the center 100. Where provision data 304 shown in FIG. 3 is HTML document data, the data displaying means 123 is a WWW browser. Where the provision data 304 in FIG. 3 is voice data, the means 123 is a voice player.

The center 100 includes a communication managing means 101, a user's status matching means 102, a user data material extracting means 103, a preference learning means 104, a user's preference data (data base: DB) 105, a spot data DB 106, a group's preference learning means 107, a group's preference data DB 108, a data inputting means 109 and a data-provider-directed data producing means 110.

The communication managing means 101 transmits data (FIG. 2) received from the user's portable data terminal 120 to the user's status matching means 102. The terminal 120 transmits spot data (FIG. 3). The means 101 further causes spot data transmitted from the data-provider-directed terminal 130 to be stored in the spot DB 106, and transmit group's preference data to the data-provider-directed terminal 130.

The user's status matching means 102 obtains spot data matched to the user's status (i.e., time, place and preference) from the spot data DB 106 on the basis of the data (i.e., user ID 200, position data 201 and measured time 202 shown in FIG. 2) transmitted from the portable data terminal 120. The preference data that is considered at the time of matching, is obtained by combining the user's preference data extracted from the user's preference data DB 105 and user group's preference data pertinent to the user as extracted form the group's preference data DB.

The user data material extracting means 103 receives data (FIG. 2) of the portable data terminal 120 from the communication managing means 101, and transmits these data to the preference learning means 104.

The preference learning means 104 extracts a user's action pattern from the data transmitted from the user data material extracting means 103, and learns the user's preference. For example, the means 104 specifies a spot stayed by the user from the position data 201 and the measured time 202 in FIG. 2. This spot data (FIG. 3) is obtained by retrieving the spot data DB 106. The means 104 extracts user's preference data from attribute data 302 representing the attribute of the spot data obtained by the retrieval. The means 104 updates user's preference data in the user's preference data DB 105 by accessing the pertinent user's preference data with the user ID.

The user ID 200 and the pertinent user's preference data are stored as set data in the user's preference data DB 105. For example, the user's preference data is expressed by a keyword list representing user's preferences. The keywords representing the user's preferences may be provided with weights, and the user's preference data is represented by a keyword vector (i.e., a set of listed keywords and weights). The keyword vector representing the user's preferences is managed by time data and place data as set data. A user's action pattern which is computed in the preference learning means 104. Spot data as shown in FIG. 3 is stored in the spot data DB 106.

The group's preference learning means 107 obtains user group's preference data from the user's preference 11 data DB 105, and learns the group's preferences. For example, the means 102 forms groups of users having resembling profile data or resembling preferences and profile data, and extracts an action pattern of the users belonging to each group or extracts group's preferences from the preference data of the individual users.

User group's preference data are stored in the group's preference data DB 108. For example, data such as a keyword list representing the preferences of each group, a list of group's user ID 200, collective preference data representing the preferences of the users belonging to the group, and preference data obtained from action patterns, are stored.

The data-provider-directed data producing means 110 extracts necessary group's preference data for each data provider by accessing the group's preference data DB 108, and instructs the communication managing means 101 to transmit the extracted data to each data provider. The data inputting means 109 feeds the contents of spot data transmitted from the data-provider-directed terminal 130 to the spot data DB 106 for storage therein. The data-provider-directed terminal 130 includes a communication managing means 131, a spot data producing means 132, a spot data DB 133, and a group's preference data DB 134. The spot data producing means 132 is used when a data provider produces spot data contents. The produced contents are stored in the spot data DB 133. Data having the data configuration as shown in FIG. 3 is stored in the spot data DB 133.

The communication managing means 131 manages communication of the data-provider-directed terminal 130 with the center 100. Specifically, the means 131 transmits spot data produced by a data provider to the center 100, and receives group's preference data obtained by learning in the center 100. The received group's preference data is stored in the group's preference data DB 134.

In the group's preference data DB 134 are stored user group's preference data, mainly contents produced by data providers. For example, when the data provider is an offerer and the produced spot data is advertisement, the client data for the goods to be advertised is stored.

The radio communication line 150 interconnects the portable data terminal 120, the center 100 and the data-provider-directed terminal 130. A portable telephone system or an internet system may be used as the line 150.

Figure 4:
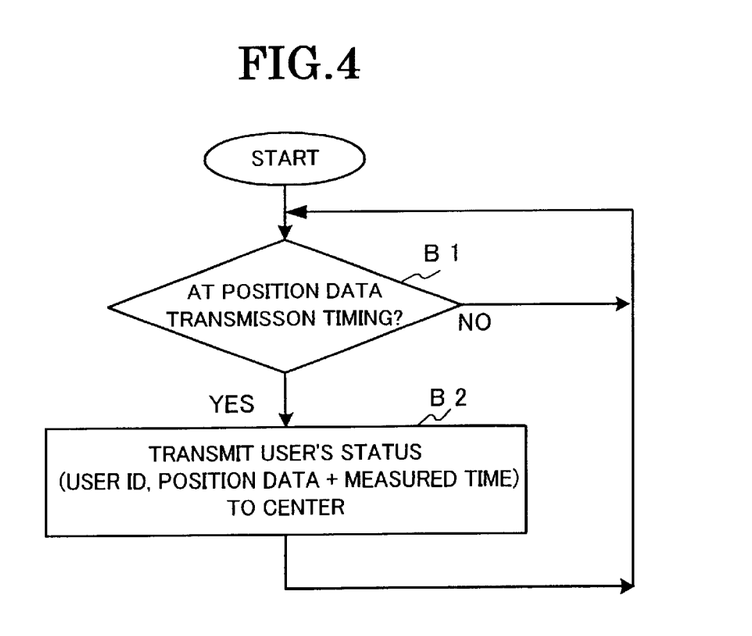
FIG. 4 shows a flow chart representing data transmission operation of the portable data terminal.

The operation according to the present invention will now be described. First, the operation of the portable data terminal 120 will be described with reference to FIGS. 4 and 5. In the terminal 120, at a position data transmission timing (step B1 in FIG. 4) the position managing means 121 extracts position data, and records measured time. The communication managing means 122 transmits the user ID of the user carrying each registered portable data terminal 120, the position data and measured time data received from the position managing means 121 to the center 100 (step B2 in FIG. 4).

Figure 5:
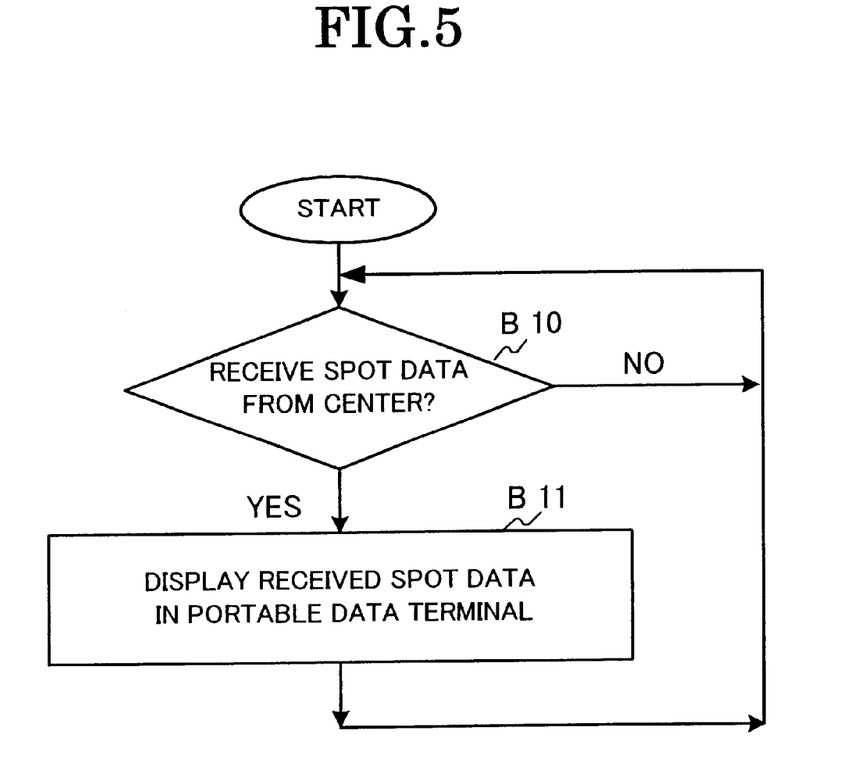
FIG. 5 shows a flow chart representing data reception operation of the portable data terminal.

When the communication managing means 122 receives spot data (FIG. 3) transmitted from the center 100 (step B10 in FIG. 5), the data displaying means 123 displays the received spot data for comprehension in the portable data terminal of the user (step B11 in FIG. 5). For example, if the provision data shown in FIG. 3 is HTML document data, the means 123 is a WWW browser. If the provision data 304 is voice data, the means 123 is a player.

The operation of the center 100 will now be described with reference to FIGS. 6 to 8.

Figure 6:
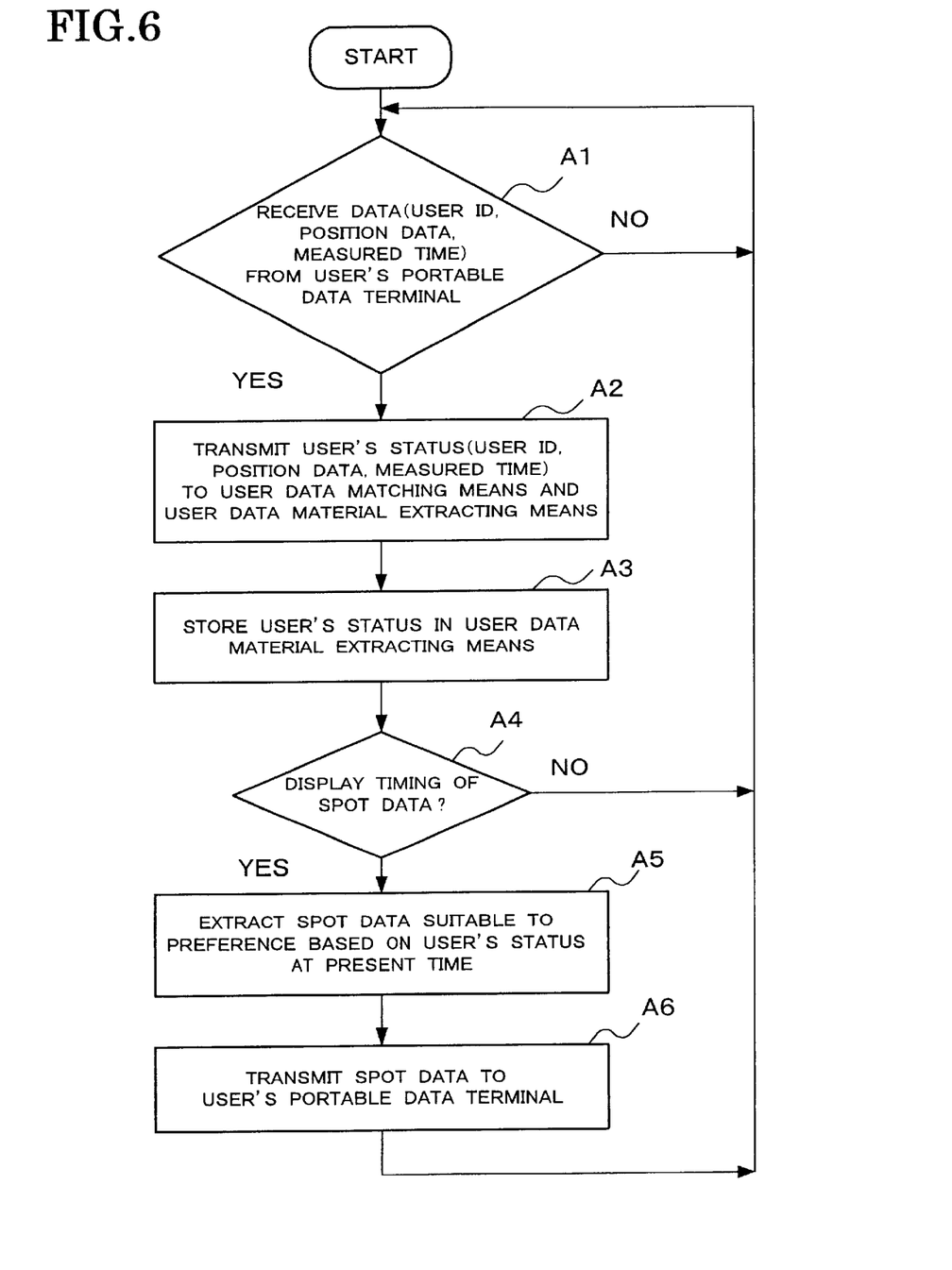
FIG. 6 shows a flow chart representing data providing operation of the center to each user.

In the center 100, the communication managing means 101 receives user's status data (FIG. 2) from the user's portable data terminal 120 (step A1 in FIG. 6), and transmits the received data to the user data material extracting means 103 and also to the user's status matching means 102 (step A2 in FIG. 6). In step A3, the means 103 may have a buffer for preserving the received user status data (FIG. 3).

In step A4 in FIG. 6, the user's status matching means 102 checks whether it is a spot data display timing for the user having transmitted the user's status data (FIG. 2). For example, the means 102 may have the individual user's spot data display timing data stored in itself. Alternatively, the means 102 may sort out the individual user's spot data display timing data stored in the user's preference data DB, so that it can be retrieved for and extracted with the user ID.

At the spot data display timing (step A4 in FIG. 6), the user's status matching means 102 retrieves the spot data (FIG. 3) in the spot data DB 106 with the measured time 202 as time data, the user's position data 201 as place data and the preference data as further condition (step A5 in FIG. 6). The preference data is a combination of two data obtained with the user ID, i.e., the user's preference data obtained by accessing the user's preference data DB 108 and the user group's preference data pertinent to the user, as extracted from the group's preference data DB 108. For example, the user's status matching means 120 may filter the spot data in the spot data DB by three different kinds of filtering, i.e., filtering with respect to time, filtering with respect to place and filtering with respect to preference. The means 120 then sorts out the spot data according to the total points computed by the three different kinds of filtering, and provides upper rank spot data to the user. The filtering with respect to time may be executed only for spot data of restaurants which are open at present time and spots suited for sight-seeing. In the filtering with respect to place, such calculation may be executed such as to make data of spots closer to the user's position to be upper rank data.

As an example, a case will now be considered, in which the user's preference data in the user's preference data DB 105 and the group's preference data in the group's preference data in the group's preference data DB are represented by keyword vectors representing preference and also the attribute data 302 of the spot data are also represented by a keyword vector. In this case, the user's status matching means 102 calculates the similarity of the keyword vector representing the user's preferences and the keyword vector representing the spot data to each other. The means 102 also calculates the similarity of the keyword vector representing the user group's preferences pertaining to the user and the keyword vector of the spot data to each other. The means 102 combines the two calculated similarities, sorts out the spot data list in the order of larger numbers of points, and causes display of only higher rank spot data to be comprehended by the user.

As for the step of combining the similarity obtained as a result of comparison of the user's preference data and the spot data and the similarity obtained as a result of comparison of the group's preference data and the spot data, it is possible to provide predetermined degrees of influence of the two calculation results. When it is desired to provide greater weight for the user's preferences, the influence of the similarity of the user's preference data and the spot data may be made greater. When it is desired to provide greater weight for the group's preferences, the influence of the similarity of the group's preference data and the spot data may be made greater.

A case will now be considered, in which the user visits a certain area for the first time. In this case, no data is provided from user's preference learning in this area. Therefore, the overall similarity as a result of comparison of the sole user's preference data and the spot data is reduced. Accordingly, the influence of the similarity as computed from the group's preference data is increased. It is thus possible to provide apt data to the user in an area first visited by him or her on the basis of the preferences of the group pertaining to him or her. As an example of method in this case, it is conceivable to increase the influence of the similarity computed from the group's preference data by a certain value when the mean similarity computed from the sole user's preference data is less than a certain value.

The user's status matching means 102 feeds out the sot data after the filtering process to the communication managing means 101, which in turn transmits the fed-out data to the user's portable data terminal 120 (step A6 in FIG. 6).

The operation of preference learning in the center 100 will now be described with reference to FIG. 7.

At a preference learning timing (step A10 in FIG. 7), the preference learning means 104 obtains the user's status data (FIG. 2) preserved in the user data material extracting means 103. The means 104 extracts only the user's status data of the same pertinent user, and detects, from the user's action pattern, the position of the spot, where it is acknowledged that the user is staying (step A11 in FIG. 7). For example, the state learning means 104 stores in it the value of such acknowledged staying time X that "the time X is acknowledged as such after X minutes of time of stay in a certain area (i.e., GPS longitude and latitude plus radius r)". When the time X has been elapsed, the means 104 decides that the user has stayed in that spot. The means 104 also has the radius data r stored in it.

Figure 7:
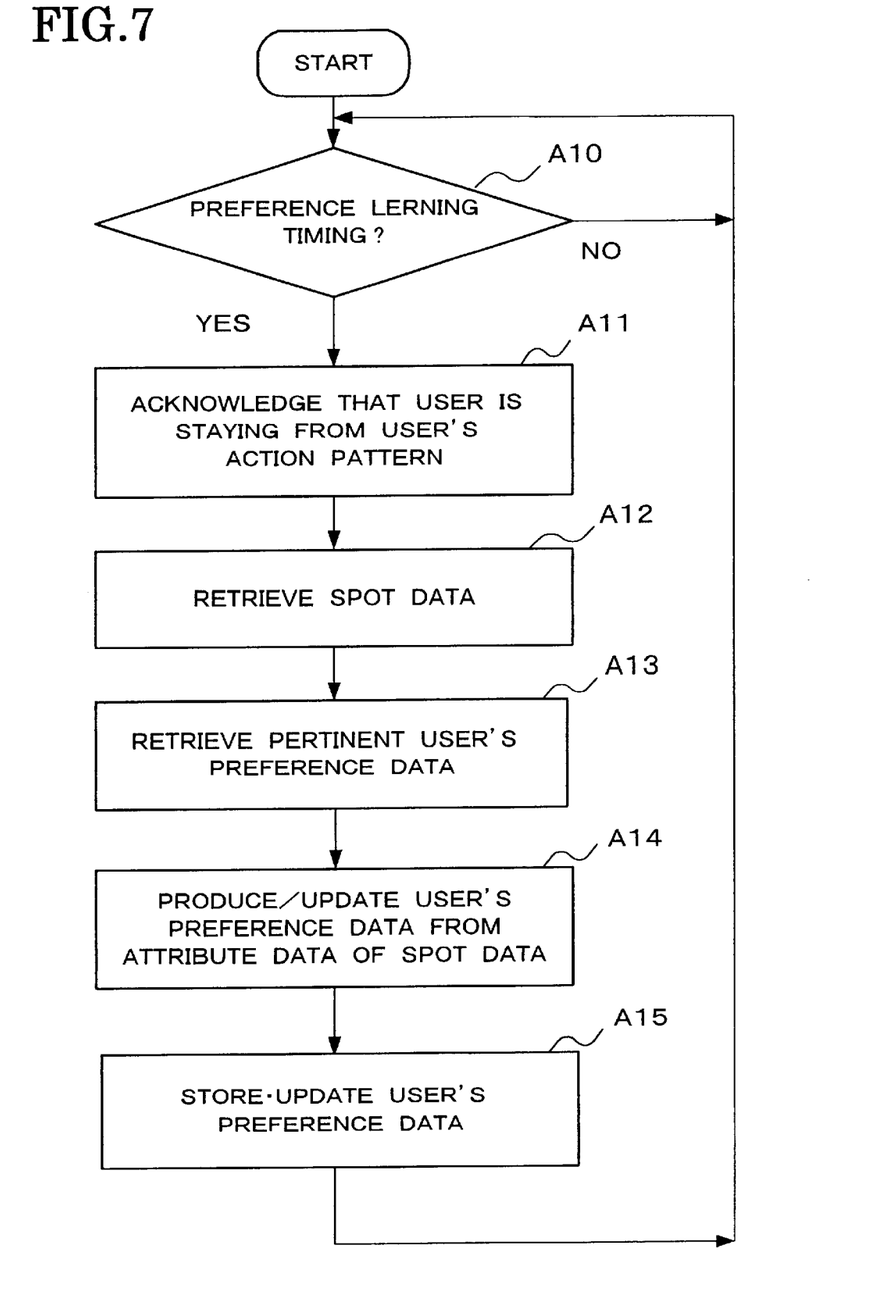
FIG. 7 shows a flow chart representing preference learning operation of the center.

The preference learning means 104 retrieves the spot data DB 106 for the spot data (FIG. 3) of the spot that is acknowledged to be stayed by the user (step A12 in FIG. 7). The preference learning means 104 retrieves the user's preference data DB 105 for the user's preference data (step A13 in FIG. 7). The preference learning means 104 extracts data related to preferences in the attribute data 302 of the spot data, and adds the extracted data to or produce the user's preference data (step A14 in FIG. 7). For example, when the user's preferences are represented by a keyword list and the attribute data 302 is the keyword list representing the provision data 304 of the spot data, that keyword list is added to the keyword list representing the user's preferences.

In the case where keyword list representing the user's preferences is managed together with time and place data, the preference learning means 104 does data updating with the position data 201, the measured time data 202 and the keyword list of the preferences as a set.

In the user's preference learning DB 105, the user ID 200 and the pertinent user's preference data are stored as set data. For example, the user's preference data may be represented by a keyword list representing user's preferences. Further, for example, the keyword representing the user's preference data is weighted and the preference data may be represented by a keyword vector (i.e., keyword list and weight as a set). Furthermore, the keyword vector representing the user's preferences may be managed by time data and place data as set data. The preference learning means 104 causes the updated or newly produced user's preference data to be stored in the user's preference data DB 105 (step A15 in FIG. 7).

The operation of group's preference learning in the center 100 will now be described with reference to FIG. 8.

Figure 8:
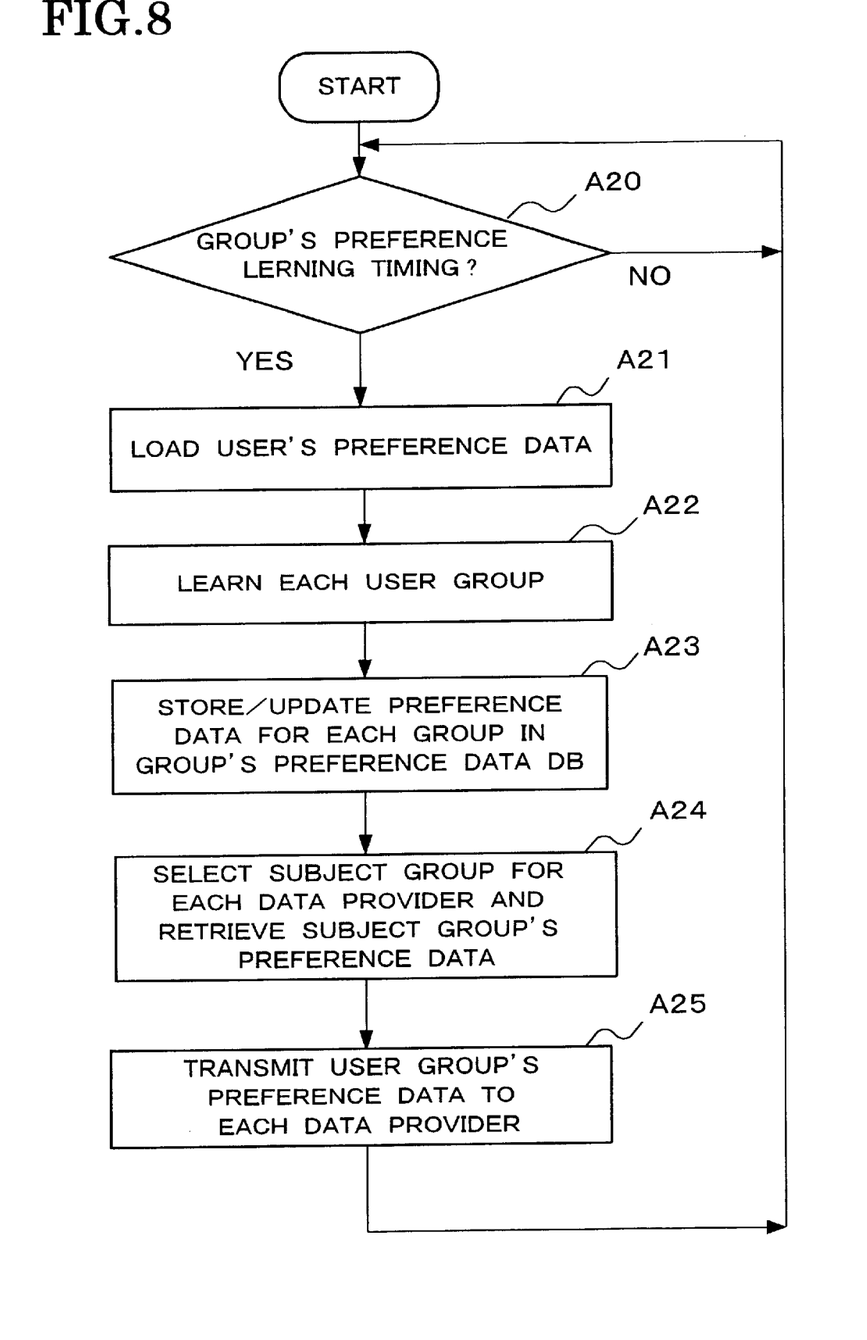
FIG. 8 shows a flow chart representing group's preference learning operation of the center.

At a group's preference learning timing (step A20 in FIG. 8), the group's preference learning means 107 loads user's preference data in the user's preference data DB 105 (step A21 in FIG. 8). The group's preference learning timing may be recorded in the group's preference learning means 107. The group's preference learning means 107 learns each user group's preference data (step A22 in FIG. 8). The group's preference learning means 107 may form user groups from the user's preference data obtained from the user's preference data DB 105, then collect the preference data of the users in each user group, and makes the result as result of learning. For example, where the preference data in the user's preference data DB have been obtained by taking time and place into considerations, the group's preference learning means 107 collects the preference data of the users in each user group by taking time and place into considerations. For example, where the action pattern of each user is stored in the user's preference data DB, after forming the user groups from the user s preference data obtained from the user's preference data DB 105, the group's preference learning means 107 extracts the group's preferences from the action patterns of the user groups, and causes the learning result data to be reflected on the group's preference learning DB 108 (step A23 in FIG. 8).

At a certain timing, the group's preference leaning means 107 retrieve the user group's preference data as data provider's subject (step A24 in FIG. 8). The user group's data as the data provider's subject and the data provision timing may be stored in the group s preference learning means 107. The group's preference learning means 107 feeds out the result of retrieval to the communicating means 101, which in turn transmits the user group's preference data as subject to each data provider (step A25 in FIG. 8).

The operation of the data-provider-directed terminal 130 will be described with reference to FIGS. 9 and 10.

First, a spot data producing operation of the data-provider-directed terminal 130 will be described with reference to FIG. 9.

Figure 9:
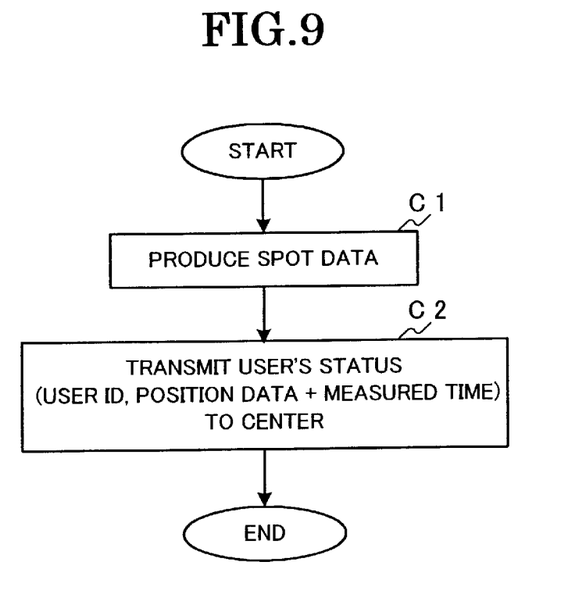
FIG. 9 shows a flow chart representing spot data producing operation in the data-provider-directed terminal.

The data provider produces spot data (FIG. 3) by using the spot data producing means 132 (step C1 in FIG. 9). The spot data producing means 132 causes produced or updated spot data to be stored in the spot data DB 133 or updated. The new spot data is transmitted via the communication means 131 to the center 100 (step C2 in FIG. 9).

A group's preference data receiving operation of the data-provider-directed terminal 130 will now be described with reference to FIG. 10.

Figure 10:
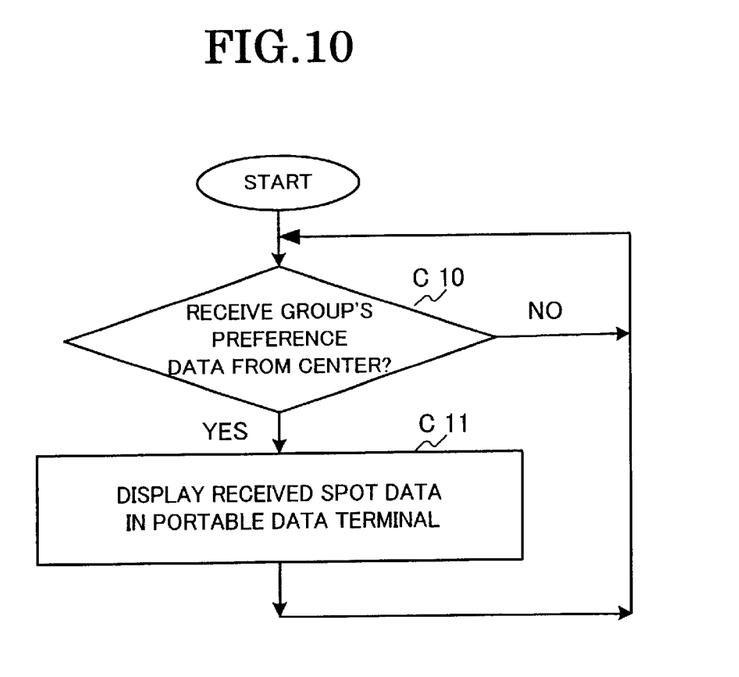
FIG. 10 shows a flow chart representing data receiving operation of the data-provider-directed terminal.

The communication managing means 131 receives group's preference data of the user group as subject of the data provider from the center 100 (step C10 in FIG. 10). The communication managing means 131 causes the received data to be stored in the group's preference data DB 134 (step C11 in FIG. 10). The data provider develops future products with reference to the data stored in the group's preference data DB 134.

As has been described in the foregoing, according to the present invention not only individual user's preferences but also user group's preferences are learned for users carrying portable data terminals, and it is possible to provide trend data on the basis of the group's preferences by taking the present time, present place and preferences of the users into consideration. It is thus possible to provide effective data for the users. In addition, user group's preference data provided as subject to the data providers can be utilized for marketing. Furthermore, where advertisement data is provided to users, the advertisement offerer as data provider can get customer data.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A mobile-user-directed data providing system comprising a portable data terminal, a center and a data-provider-directed terminal, the terminals and the center being interconnected by a communication line, wherein:

the portable data terminal includes:
   a position managing means for obtaining and managing the position of the portable data terminal;
   a communication managing means for managing the position data, time data of time when the position data is obtained and user ID specifying a user as transmission data, transmitting the transmission data to the center and receiving data therefrom; and
   data displaying means for displaying the data received from the center;

the center includes:
   a communication managing means for transmitting and receiving data to and from the portable data terminal and the data-provider-directed terminal;
   user data material extracting means for extracting the present time and the present place of each user from data received therefrom and preserving the extracted data;
   a spot data database for storing the position data and spot data of explanation contents concerning restaurants and sight-seeing spots;
   a preference learning means for learning user's preferences from the data stored in the user data material extracting means and the spot data database;
   a user's preference data database for storing each user's preference data produced by learning in the preference learning means;
   a group's preference learning means for learning user group's preference data from the data stored in the user's preference data database;
   a group's preference data database for storing user group's preference data produced by learning in the group's preference learning means;
   a user's status matching means for selecting spot data on the basis of the user's present time and present place, preference data and user group's preference data obtained with the user ID from the user's preference data database and the group's preference data database, respectively, and instructing the communication managing means to transmit the selected spot data to the user's portable data terminal;
   a data-provider-directed data producing means for instructing the communication managing means to transmit the result of retrieval of subject user group's preference data in the group's preference data database for each data provider to the data-provider-directed terminal; and
   a data inputting means for inputting the spot data from the data-provider-directed terminal to the spot data database; and the data-provider-directed terminal includes:
   a communication managing means for transmitting and receiving data to and from the center;
   a spot data producing means used by the data provider for producing contents of spot data and instructing the communication managing means to transmit the produced spot data to the center;
   a spot data database for storing the spot data produced in the spot data producing means; and
   a group's preference data database for receiving the group's preference data transmitted from the center and received via the communication managing means.

2. The mobile-user-directed data providing system according to claim 1, wherein the spot data database deals with advertisement data as spot data.

3. The mobile-user-directed data providing system according to claim 1, wherein the communication line is a portable telephone line.

4. A mobile-user-directed data providing method in a data providing system comprising a user's portable data terminal, a center and a data-provider-directed terminal, the terminals and the center being interconnected by a communication line, comprising:
   a step of learning user's preferences from a spot data database, in which position data and spot data of explanation contents such as restaurants and sight-seeing spots are stored, and storing the learned user's preference data in a use's preference data database;
   a step of extracting the user's present time and present place data received from the user and preserving the extracted data;

a step of learning user group's preference data from data stored in the user's preference data database and storing the learned data in a group's preference data database;

a step of selecting spot data on the basis of the user's present time and present position, and preference data and user group's preference data obtained with user ID from the user's preference data base and the group's preference data base obtained from user's group preference data, and instructing the transmission of the selected spot data to the portable data terminal of the user;

a step of retrieving user group's preference data in the group's preference data database as subject for each data provider and transmitting the result of retrieval to the data-provider-directed terminal;

a step of inputting the spot data from the data-provider-directed terminal to the spot data database;

a step of producing contents of spot data, storing the produced contents in a spot data database and instructing the transmission of the produced spot data to the center; and a step of receiving group's preference data and storing the received data in the group's preference data database.

5. The mobile-user-directed data providing method according to claim 4, wherein the spot data database deals with advertisement data as spot data.

6. The mobile-user-directed data providing method according to claim 1, wherein the communication line is a portable telephone line.

7. A center in a data providing system comprising a portable data terminal, the center and a data-provider-directed terminal, the terminals and the center being interconnected by a communication line, the center comprising:

a preference learning means for learning user's preferences from the data stored in the user data material extracting means and the spot data database;

a user's preference data database for storing each user's preference data produced by learning in the preference learning means;

a group's preference learning means for learning user group's preference data from the data stored in the user's preference data database;

a group's preference data database for storing user group's preference data produced by learning in the group's preference learning means;

a user's status matching means for selecting spot data on the basis of the user's present time and present place, preference data and user group's preference data obtained with the user ID from the user's preference data database and the group's preference data database, respectively, and instructing the communication managing means to transmit the selected spot data to the user's portable data terminal; and a data-provider-directed data producing means for instructing the communication managing means to transmit the result of retrieval of subject user group's preference data in the group's preference data database for each data provider to the data-provider-directed terminal.

* * * * *

UNITED STATES PATENT AND TRADEMARK OFFICE
CERTIFICATE OF CORRECTION

PATENT NO.    : 6,701,154 B2
DATED         : March 2, 2004
INVENTOR(S)   : Noriko Ito It is certified that error appears in the above-identified patent and that said Letters Patent is hereby corrected as shown below:

Tile page,
Item [56], References Cited, FOREIGN PATENT DOCUMENTS, insert the following
-- JP    11-312487    3/2001
   JP    11-290379    3/2001 --

Signed and Sealed this

Twenty-second Day of June, 2004

JON W. DUDAS
*Acting Director of the United States Patent and Trademark Office*